UNITED STATES PATENT OFFICE.

SAMUEL SOMERVILLE, OF CLOQUET, MINNESOTA.

LINIMENT.

SPECIFICATION forming part of Letters Patent No. 397,033, dated January 29, 1889.

Application filed September 24, 1888. Serial No. 286,251. (No specimens.)

*To all whom it may concern:*

Be it known that I, SAMUEL SOMERVILLE, a citizen of the United States, and a resident of Cloquet, in the county of Carlton and State of Minnesota, have invented certain new and useful Improvements in Liniments; and I do hereby declare that the following is a full, clear, and exact description of the invention, which will enable others skilled in the art to which it appertains to make and use the same.

My invention relates to a liniment or compound for external application, especially adapted for the treatment of acute, chronic, and inflammatory rheumatism, pains, sores, bruises, &c.; and it consists in the following ingredients, combined in the proportions stated, viz:

| | Ounces, avoirdupois. |
|---|---|
| Alcohol | 14 |
| Camphor-gum | 2 |
| Oil of origanum | 1 |
| Oil of turpentine | 1 |
| Rock-oil | 1 |
| Nitrate of potassa | 2 |
| Castile-soap | 1 |
| Boiling soft water | 16 |

In using the above-named composition the gum-camphor should first be dissolved in the alcohol. The castile-soap should then be shaved very fine, and this, together with the nitrate of potassa, should be added to the boiling soft water and thoroughly mingled and agitated until the castile-soap and nitrate of potassa are dissolved. The oil of origanum, oil of turpentine, and rock-oil are then mixed together and added to the solution of castile-soap and nitrate of potassa. The whole is then placed on the fire and allowed to reach the boiling state, after which it should be removed from the fire and thoroughly agitated for five minutes, when the alcoholic camphor is added. All the ingredients are then mingled thoroughly by agitation for one-fourth of an hour, and then put in bottles, when they should again be well shaken, care being also taken to agitate the liniment each time the same is used.

By the use of this composition great benefit is obtained in the treatment of acute, chronic, and inflammatory rheumatism, bruises, sprains, swellings, pains in the limbs, and lame backs. It will also be found exceedingly efficacious in stimulating the kidneys by a liberal application of the composition to the back of the sufferer. It will also relieve pain in the lungs by an application to the chest. In the treatment of chilblains or scalded feet I have also found that it affords speedy relief, in which cases the liniment is applied, preferably, three times a day to the affected parts.

I am aware that these ingredients have been used before in various combinations and proportions; but I am not aware that they have been before used in the combination and proportions herein set forth.

What I claim, and desire to secure by Letters Patent, is—

The herein-described composition of matter, consisting of alcohol, camphor-gum, oil of origanum, oil of turpentine, rock-oil, nitrate of potassa, castile-soap, and soft water, mixed in about the proportions set forth.

In testimony that I claim the foregoing as my own I have hereunto affixed my signature in presence of two witnesses.

SAMUEL SOMERVILLE.

Witnesses:
DAVID MOSES,
CHARLES B. KELLOGG.